United States Patent [19]

Uram, Jr.

[11] Patent Number: 4,905,935
[45] Date of Patent: Mar. 6, 1990

[54] AIRCRAFT WINDSHIELD TRANSPARENCY
[75] Inventor: John R. Uram, Jr., Glendale, Ariz.
[73] Assignee: Loral Corporation, New York, N.Y.
[21] Appl. No.: 171,069
[22] Filed: Mar. 21, 1988
[51] Int. Cl.4 .............................................. B64C 1/14
[52] U.S. Cl. ................................. 244/121; 244/129.3; 296/201; 296/96.21
[58] Field of Search ............... 244/129.3, 121; 52/171, 52/789; 428/38, 429, 428, 412, 431, 480; 525/128, 438; 524/730; 296/84.1

[56] References Cited

U.S. PATENT DOCUMENTS

| 3,559,928 | 2/1971 | Dohmeyer | 244/129.3 |
|---|---|---|---|
| 3,807,791 | 4/1974 | Boyer | 296/84.1 |
| 3,836,193 | 9/1974 | Donahoe | 52/789 |
| 4,020,033 | 4/1977 | Dannels | 524/730 |
| 4,204,374 | 5/1980 | Olson | 244/121 |
| 4,224,436 | 9/1980 | Doss | 428/480 |
| 4,258,105 | 3/1981 | Williams | 428/431 |
| 4,267,307 | 5/1981 | Louthan et al. | 525/438 |
| 4,725,501 | 2/1988 | Rukavina et al. | 428/412 |

Primary Examiner—Joseph F. Peters, Jr.
Assistant Examiner—Anne Sartelle
Attorney, Agent, or Firm—L. A. Germain

[57] ABSTRACT

An aircraft windshield transparency includes a base frame defining an opening into which an inboard-positioned transparency is mounted with at least one outboard-positioned transparency and an interlayer between the two transparencies. The interlayer exhibits a stronger adhesion to the outboard transparency than to the inboard transparency. The peripheries of the outboard transparency and interlayer carry a means which functions to expose a groove penetrating to the surface of the inboard transparency such that the outboard transparency and interlayer may be removed and the inboard transparency thereafter functions as the primary windshield transparency of the aircraft.

8 Claims, 2 Drawing Sheets

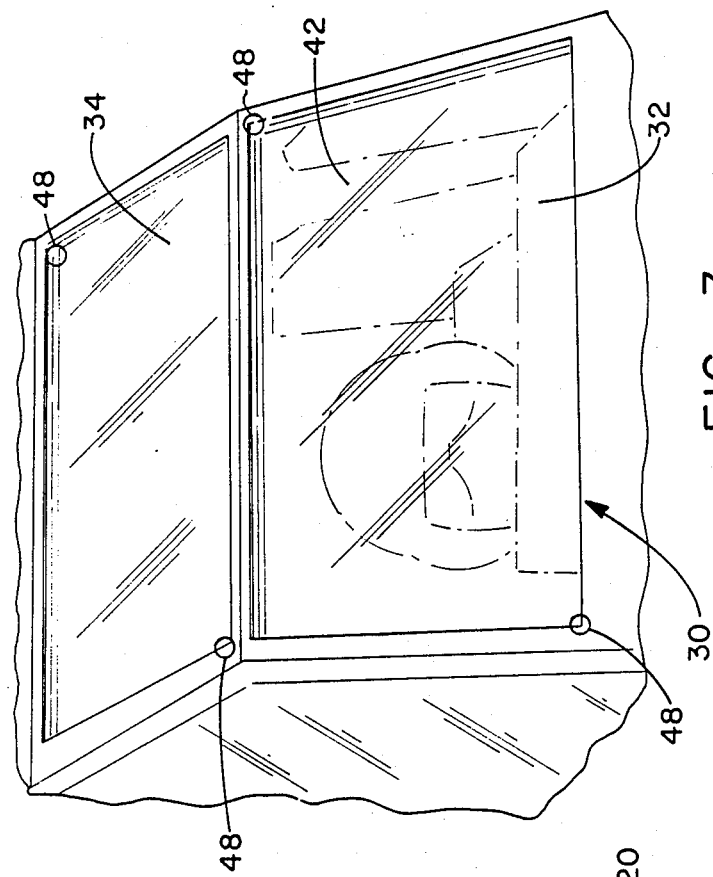
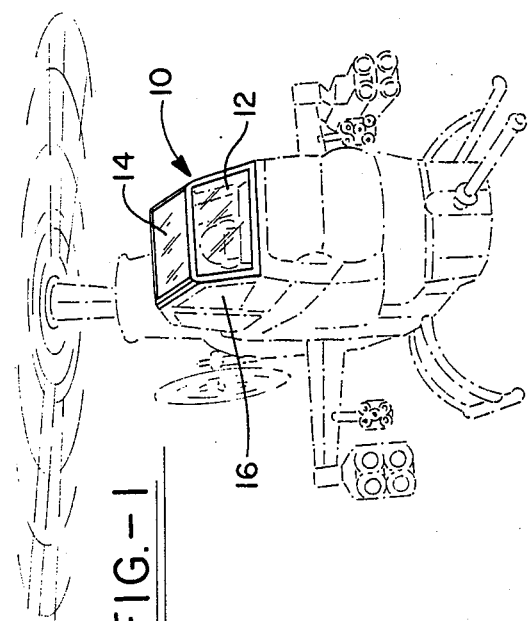
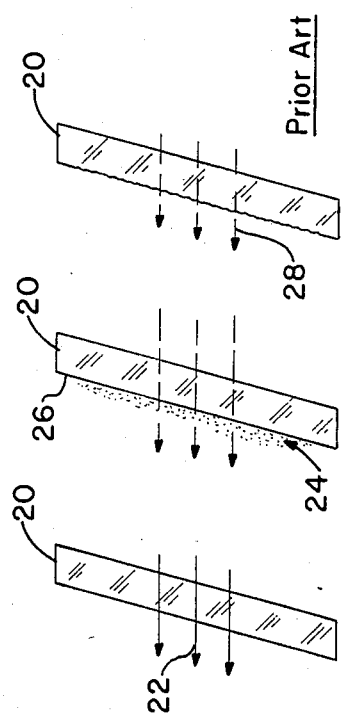
FIG.-3
FIG.-1
FIG.-2A  FIG.-2B  FIG.-2C Prior Art

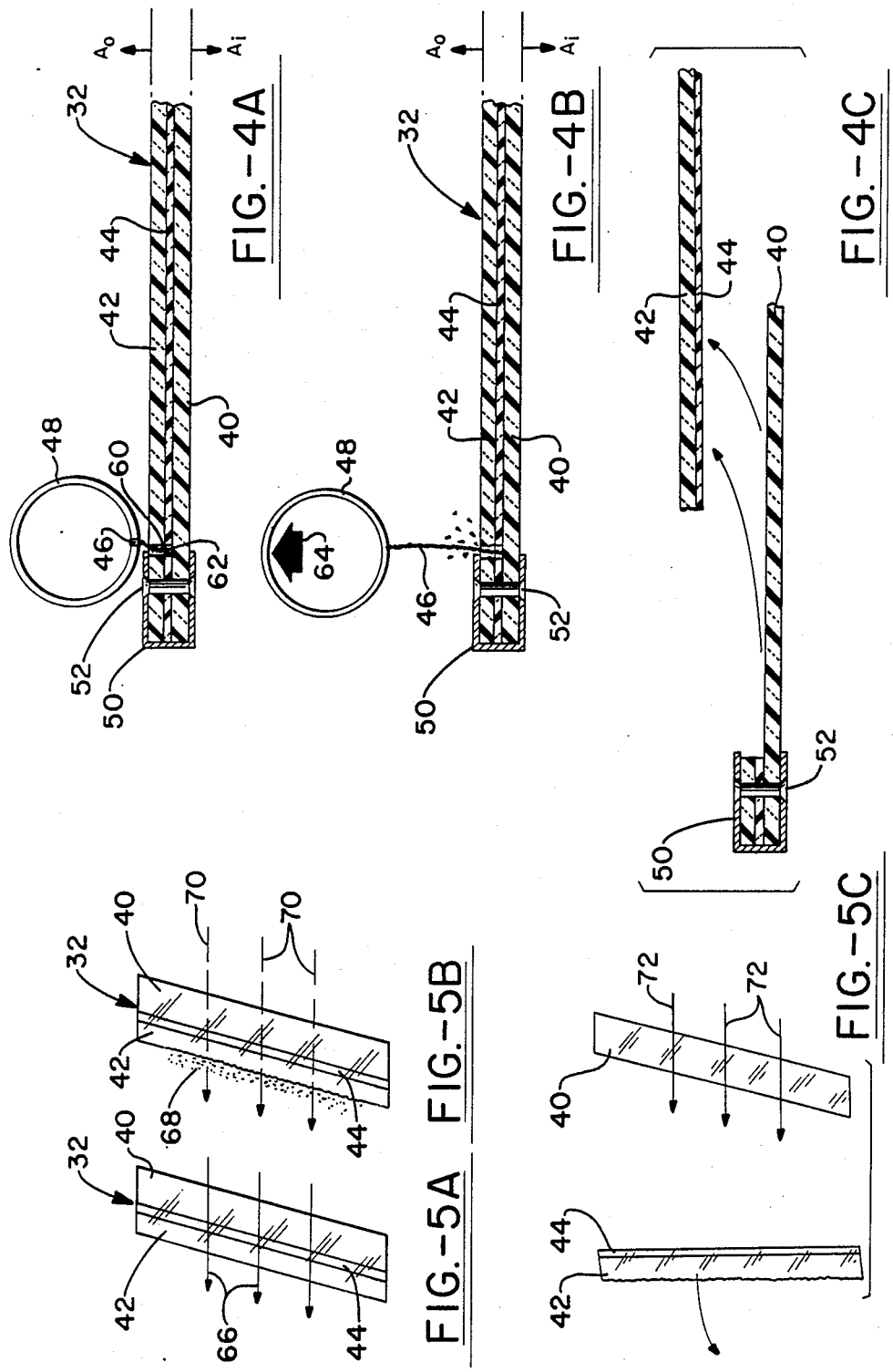

AIRCRAFT WINDSHIELD TRANSPARENCY

BACKGROUND OF THE INVENTION

This invention generally relates to aircraft transparencies and more particularly to windshield transparencies as may be applied to low flying tactical aircraft, such as for example, helicopter gunship-type aircraft.

The term "transparency" as used in this specification is intended to describe a body of transparent material which comprises a selection taken from the group including acrylic, polycarbonate, and polyurethane resin materials. Further, a "transparency" may comprise single ply sheet material, multiple layers of single ply sheet material, multiple plies forming a laminate, and/or any combinations thereof.

Windshield transparencies of the type alluded to suffer optical degradation due not only to operational hazards but also due to airborne dust, sand, and other types of grit which are present in the environment to abrade the outer surface of the transparency when these aircraft are used for low flying tactical missions. Presently, the aircraft is taken out of service in the field so that a badly abraded windshield transparency may be replaced. This is, of course, a disadvantage in the service life of such aircraft.

It is therefore in accordance with one aspect of the present invention, an object to extend the useful service life of an aircraft windshield transparency over the present service life in the field due to an abraded and/or damaged transparency.

It is in accordance with another aspect of the invention an object to provide a windshield transparency for a tactical helicopter which may be easily serviced in the field such that the resultant transparency is as good as the original was prior to its being damaged by the environment.

SUMMARY OF THE INVENTION

This invention provides a window transparency for an aircraft comprising a base frame defining an opening and adapted for receiving transparency material therein; a first transparency mounted in an inboard position within the base frame; at least one additional transparency mounted in an outboard position within the base frame; an interlayer between the transparencies and characterized by exhibiting a stronger adhesion to the outboard-mounted transparency than to the inboard-mounted transparency; and a means carried about the peripheries of at least one outboard transparency and the interlayer to expose a groove which is cut into the outboard-mounted transparency and interlayer to the surface of the inboard-mounted transparency such that the outboard-mounted transparency and interlayer may be removed to expose the inboard-mounted transparency.

BRIEF DESCRIPTION OF THE DRAWINGS

The invention and various advantages thereof will be better understood from a consideration of the following detailed description and the accompanying drawings, in the several figures in which like reference numerals indicate like elements and wherein:

FIG. 1 is a frontal perspective view of a helicopter gunship-type aircraft illustrating the environment of the present invention which includes a windshield transparency shown in solid lines while the remainder of the aircraft is shown in ghost dot-dashed lines;

FIGS. 2A, 2B, and 2C diagramatically illustrate how a prior art windshield transparency is optically degraded by impinging particles of sand, dust, and/or grit;

FIG. 3 is a greatly enlarged showing of the windshield transparency illustrated in FIG. 1 but modified in accordance with this invention;

FIGS. 4A, 4B, and 4C are elevational views, in cross-section, illustrating the manner of removing at least one outboard-mounted transparency to expose an inboard-mounted transparency which is used for the remainder of the windshield service life; and FIGS. 5A, 5B, and 5C diagramatically illustrate how a windshield transparency in accordance with the present invention achieves an increased service life.

DETAILED DESCRIPTION OF THE INVENTION

Referring to the drawings, FIG. 1 illustrates a tactical helicopter gunship having various armaments and which may be used for low altitude-type missions. The aircraft has frontal window transparencies generally indicated by reference numeral 10 and these provide for dead-ahead pilot viewing through a windshield transparency 12 and for upward angular pilot viewing through a window transparency 14. The aircraft also has various other window transparencies including side window transparencies indicated at 16, however, these do not suffer the same threat exposure and/or optical degradation as do the frontal transparencies 10. While the present inventive concept may be applied to any type of aircraft transparency, this description will be directed only to the frontal or windshield-type transparencies 10 of the aircraft.

Referring to FIGS. 2A, 2B, and 2C of the drawings, the optical degradation of a prior art windshield transparency 20 is diagramatically illustrated. The transparency 20 is typically an optical grade polymeric material and may comprise an acrylic, polycarbonate, or polyurethane resin material and these are well known in the art to which this invention pertains. FIG. 2A illustrates a normal pilot viewing performance through the transparency 20 and this is indicated by the solid arrows 22. FIG. 2B illustrates the transparency 20 being exposed to impinging particles of dust, sand, and/or other type airborne grit indicated generally by reference numeral 24 and these effect an erosion or abrading of the outer surface 26 of the material comprising the transparency 20. FIG. 2C illustrates the optical performance of the transparency 20 after the threat exposure and the broken arrows 28 indicate an optical degradation of the transparency. Obviously, the transparency 20 must be completely replaced so that normal optical performance may be restored to the pilot of the aircraft.

FIG. 3 is an enlarged showing of the helicopter frontal transparencies illustrated in FIG. 1 but modified in accordance with the teaching of this invention. The frontal transparencies are generally indicated by reference numeral 30 and comprise a windshield transparency 32 for dead-ahead pilot viewing and a window transparency 34 for upward angular pilot viewing. Since both transparencies 32 and 34 may be fabricated in identical manner, the description will proceed with respect to only the windshield transparency 32.

Referring now to FIGS. 4A, 4B, and 4C of the drawings, a windshield transparency 32 is illustrated in cross-section and the inboard direction of the windshield is indicated by arrow $A_i$ while the outboard direction is indicated by arrow $A_o$. The windshield transparency 32 comprises an inboard-mounted transparency 40, an outboard-mounted transparency 42, and an interlayer 44 between the transparencies 40,42. The transparencies 40,42 and associated interlayer 44 are all mounted in a windshield base frame or framework 50 which includes a plurality of edge fasteners 52 in a conventional manner.

The interlayer 44 is strongly adhered or bonded to the outboard-mounted transparency 42 but exhibits less adhesion to the inboard-mounted transparency 40. This may be accomplished in various ways and/or techniques depending upon the selection of materials comprising the transparencies and interlayer. For example, when the transparencies 40,42 are comprised of the same and/or similar type materials, the interlayer 44 may comprise a laminate having an outboard directed surface exhibiting a strong adhesion to the material comprising the outboard-mounted transparency 42 and having an inboard directed surface exhibiting somewhat less adhesion to the material comprising the inboard-mounted transparency 40. Alternatively, the interlayer 44 may comprise a single material composition and a primer material may be used as between the outboard-mounted transparency 42 and interlayer 44 while no primer is used between the interlayer and inboard-mounted transparency 40. The primer, of course, provides the necessary stronger adhesion to the transparency 42. Various other alternatives and/or combinations will become obvious to those persons skilled in this art and the invention is not considered limited thereto or thereby.

In any event, and to continue, a groove 60 is cut about the periphery of the windshield 32 within the boundary of the framework 50 and to a depth not exceeding the combined thicknesses of the outboard-mounted transparency 42 and the interlayer 44. In other words, the groove 60 does not penetrate into the inboard-mounted transparency 40. A wire 46 having an attached pull-ring 48 at one terminal end thereof is laid into the groove 60 and thereafter embedded in a sealant material 62. In FIG. 4B it can be seen and appreciated that, upon pulling of the ring 48 in the direction of arrow 64, i.e., outboardly away from the surface of the transparency 42, the wire will cut through the sealant 62 and thus re-open the groove 60. This exposes the peripheral edges of the transparency 42 and interlayer 44 and because of the difference in adhesion as between the interlayer and the transparencies 40,42, the transparency 42 and interlayer 44 may be peeled away or otherwise removed from the inboard-mounted transparency 40 as illustrated in FIG. 4C.

FIGS. 5A–5C illustrate diagramatically the advantage of the invention, arrows 66 indicating a pilot's clear-view vision through the windshield transparency 32 which is of a construction similar to that shown in FIGS. 4A–4C. Environmentally produced particles 68 or other present hazards effect an abrasion of transparency 42 and the arrows 70 indicate a pilot's impaired view through the windshield because of a degradation in the optical quality. FIG. 5C illustrates removal of the outboard-mounted transparency 42 which is accompanied by the interlayer 44 and this, in the manner illustrated in FIG. 4B. An optically acceptable inboard-mounted transparency 40 remains to function as the primary windshield for continued service and the arrows 72 indicate a restored clear-view vision through the windshield. The transparency 40 may be used until it also suffers sufficient degradation to be removed and it is replaced in the conventional manner, i.e., a new windshield 32 is mounted in the aircraft. Obviously, it will be recognized that the service life of the original windshield transparency 32 may be doubled if the period of service of the inboard-mounted transparency 40 is about equal to that of the removed outboard-mounted transparency 42. From the foregoing it will also be recognized that the service life may be extended even further by merely increasing the number of removable outboard-mounted transparencies 42. Accordingly, with each such outboard-mounted transparency an associated interlayer must be used along with grooves 60 and cutting wires 46. In this respect, the only limitation will be with regard to the number of such transparencies and associated interlayers which may be accomodated within the windshield framework 50 and a particular aircraft mounting configuration.

As hereinbefore stated, the transparencies 40,42 may be comprised of various known optical grade materials and these include acrylic, polycarbonate, and polyurethane resin materials. These are known and applied to aircraft-type applications and the invention is not considered limited to any particular material and/or combination. In addition, the various transparencies 40,42 are shown in the drawings as individual plies and it should be understood that this is for the purpose of illustration only since these transparencies may as well comprise multi-ply laminations of transparency material.

The interlayer 44 may comprise any suitable material in cast or sheet form. A particular material which may be applied to this invention may be a silicone ply such as a heat-cured silicone elastomer. A specific example of such an interlayer is DC-X4-4643S silicone elastomeric sheet as produced by Dow-Corning Corporation, Midland, Mich. An example of another interlayer is the various room temperature vulcanizing silicone rubbers of the polysiloxane family. Either of these type interlayer materials or combinations thereof, that is a lamina, may be utilized.

It is stated hereinbefore that the interlayer 44 must be sufficiently adhered or bonded to the outboard-mounted transparency 42 and exhibit substantially less adhesion to the inboard-mounted transparency 40 such that when the outboard-mounted transparency 42 is removed, the interlayer 44 is removed along with it. It was alluded to that this may be accomplished by way of a primer which is applied to the interface between the interlayer and the outboard-mounted transparency 42. Suitable primers which may be used are the various silicate primers and these are generally dispersed or dissolved in a suitable solvent such as the various alkyl alcohols. Methanol and ethanol are the preferred examples and a particular one such primer is GE-SS4120 which comprises 50 percent by weight of ethanol, approximately 44 percent by weight of methanol, and approximately 6 percent by weight of ethyl silicate.

Finally, when the groove 60 is cut through the thickness of the outboard-mounted transparency 42 and through the thickness of the interlayer 44 to the surface of the inboard-mounted transparency 40, a sealant material 62 must be replaced in the groove 60. Such sealant maintains the structural integrity of the windshield prior to removal of the outboard-mounted transparency. A suitable sealant material may comprise a mercaptan terminated resin of the type disclosed and/or claimed in the applicant's prior U.S. Patents identified by the the following: U.S. Pat. No. 4,343,928 issued 08-10-82; U.S. Pat. No. 4,450,202 issued 05-22-84; U.S. Pat. No. 4,454,201 issued 06-12-84; U.S. Pat. No. 4,352,848 issued 10-05-82; U.S. Pat. No. 4,412,052 issued 10-25-83; and U.S. Pat. No. 4,412,046 issued b 10-05-83. Teachings disclosed in these patents which may be applicable to this invention are incorporated by reference herein.

While certain specific elements and details have been shown for the purpose of illustrating the invention, it will be apparent to those skilled in this art that various changes may be made therein without departing from the spirit or scope of the invention.

What is claimed is:

1. A transparency for an aircraft windshield and the like comprising in combination:
   a base frame defining an opening and adapted for receiving transparency material therein:
   a first transparency mounted at an inboard position with the base frame;
   at least one additional transparency mounted at an outboard position within the base frame with respect to the first transparency;
   an interlayer between the transparencies characterized by exhibiting a stronger adhesion to the outboard transparency than to an inboard transparency; and
   means associated with the outboard transparency and with the interlayer, said means positioned within a groove which is cut peripherally about and within the opening defined by the base frame and which penetrates through the outboard transparency and interlayer to the surface of an inboard transparency, said means maintained within the groove by a sealant material and which may effect cutting through the sealant to expose the groove to the surface of an inboard transparency and permit removal of the outboard transparency and interlayer from within the opening defined by the base frame without otherwise demounting them from the base frame such that an inboard transparency is exposed to function as the outboard windshield transparency of the aircraft.

2. A transparency as set forth in claim 1 wherein the inboard and outboard transparencies comprise a polymeric resin material selected from a group comprising acrylic, polycarbonate, and polyurethane resin materials.

3. A transparency as set forth in claim 2 wherein the interlayer comprises silicone.

4. A transparency as set forth in claim 3 wherein a silicate primer effects adhesion between the silicone interlayer and the outboard transparency.

5. A transparency as set forth in claim 1 wherein the means to effect removal of the outboard transparency and the interlayer comprises at least one cutting wire embedded in a sealant in a groove which is cut through the outboard transparency and the interlayer to the surface of an inboard transparency, said groove being peripherally oriented within the opening defined by the base frame such that said wire may cut through the sealant and expose the groove and the outboard transparency and interlayer may be peeled free and removed from an inboard transparency.

6. A transparency as set forth in claim 5 wherein the sealant comprises a mercaptan terminated resin.

7. A transparency as set forth in claim 1 as it may be applied to a tactical helicopter windshield configuration.

8. A windshield for an aircraft and the like comprising at least one pair of transparencies mounted within a window framework and an interlayer material between them, the interlayer-material exhibiting a stronger adhesion to a transparency that is positioned outboardly within the framework than to a transparency that is positioned inboardly within the framework and a means associated with the outboardly-positioned transparency and interlayer material to expose a peripheral groove penetrating to, but not including, the inboardly-positioned transparency such that the outboardly-positioned transparency and interlayer material may be removed from the window framework and thus expose the inboardly-positioned transparency.

* * * * *